United States Patent
Reddy et al.

(10) Patent No.: US 10,619,090 B1
(45) Date of Patent: Apr. 14, 2020

(54) FRACTURING FLUID COMPOSITIONS HAVING PORTLAND CEMENT CLINKER AND METHODS OF USE

(71) Applicant: Saudi Arabian Oil Company, Dhahran (SA)

(72) Inventors: B. Raghava Reddy, Pealand, TX (US); Feng Liang, Cypress, TX (US)

(73) Assignee: Saudi Arabian Oil Company, Dhahran (SA)

(*) Notice: Subject to any disclaimer, the term of this patent is extended or adjusted under 35 U.S.C. 154(b) by 0 days.

(21) Appl. No.: 16/383,916

(22) Filed: Apr. 15, 2019

(51) Int. Cl.
| | |
|---|---|
| *E21B 43/267* | (2006.01) |
| *C09K 8/80* | (2006.01) |
| *C04B 41/48* | (2006.01) |
| *C04B 41/00* | (2006.01) |
| *C04B 7/48* | (2006.01) |

(52) U.S. Cl.
CPC ............. *C09K 8/805* (2013.01); *C04B 7/48* (2013.01); *C04B 41/009* (2013.01); *C04B 41/4823* (2013.01); *E21B 43/267* (2013.01)

(58) Field of Classification Search
None
See application file for complete search history.

(56) References Cited

U.S. PATENT DOCUMENTS

| | | | |
|---|---|---|---|
| 2,933,135 A | 4/1960 | Johnson | |
| 3,053,764 A | 9/1962 | Hummel et al. | |
| 3,147,127 A | 9/1964 | Shannon | |
| 3,219,109 A | 11/1965 | Stein | |
| 3,366,177 A | 1/1968 | Powers et al. | |
| 3,729,052 A | 4/1973 | Caldwell | |
| 3,888,311 A | 6/1975 | Cooke, Jr. | |
| 3,953,222 A | 4/1976 | Bainton | |
| 4,086,098 A | 4/1978 | Le Ruyet et al. | |
| 4,127,548 A | 11/1978 | Alexander | |
| 4,443,347 A * | 4/1984 | Underdown | C09K 8/62 166/280.2 |
| 4,784,693 A | 11/1988 | Kirkland et al. | |

(Continued)

FOREIGN PATENT DOCUMENTS

| | | |
|---|---|---|
| CN | 101560084 A | 10/2009 |
| CN | 103570298 A | 2/2014 |

(Continued)

OTHER PUBLICATIONS

"About clinker," cement kilns, retrieved Feb. 28, 2018 from http://www.cementkilns.co.uk/ck_clinker.html (Year: 2018); pp. 1-5.

(Continued)

*Primary Examiner* — Andrew Sue-Ako
(74) *Attorney, Agent, or Firm* — Bracewell LLP; Constance G. Rhebergen; Brian H. Tompkins

(57) ABSTRACT

Proppant compositions for hydraulic fracturing that include Portland cement clinker are provided. A cement clinker proppant composition for hydraulic fracturing may include Portland cement clinker and another proppant. Another cement clinker proppant composition for hydraulic fracturing may include resin-coated Portland cement clinker and another proppant. Methods of hydraulic fracturing using the cement clinker proppant compositions and manufacturing the cement clinker proppant compositions are also provided.

7 Claims, 3 Drawing Sheets

(56) References Cited

U.S. PATENT DOCUMENTS

| | | | |
|---|---|---|---|
| 5,529,123 | A | 6/1996 | Carpenter et al. |
| 5,728,209 | A | 3/1998 | Bury et al. |
| 6,173,778 | B1 | 1/2001 | Rae et al. |
| 6,257,336 | B1 | 7/2001 | Audibert et al. |
| 6,800,129 | B2 | 10/2004 | Jardine et al. |
| 6,814,798 | B2 | 11/2004 | Vijn et al. |
| 6,815,399 | B1 | 11/2004 | Johnson et al. |
| 7,044,224 | B2 | 5/2006 | Nguyen |
| 7,147,067 | B2 | 12/2006 | Getzlaf et al. |
| 7,182,137 | B2 | 2/2007 | Fyten et al. |
| 7,281,581 | B2 | 10/2007 | Nguyen et al. |
| 7,325,608 | B2 | 2/2008 | Van Batenburg et al. |
| 7,332,026 | B2 | 2/2008 | Fyten et al. |
| 7,424,913 | B2 | 9/2008 | Roddy |
| 7,448,450 | B2 | 11/2008 | Luke et al. |
| 7,478,675 | B2 | 1/2009 | Roddy et al. |
| 7,493,968 | B2 | 2/2009 | Reddy et al. |
| 7,743,828 | B2 | 6/2010 | Roddy et al. |
| 7,744,689 | B2 | 6/2010 | Hojaji |
| 7,897,546 | B2 | 3/2011 | Showalter et al. |
| 8,083,851 | B2 | 12/2011 | Crudden et al. |
| 8,540,025 | B2 | 9/2013 | Reddy et al. |
| 8,636,069 | B2 | 1/2014 | Reddy et al. |
| 8,733,439 | B1 | 5/2014 | Bakshi |
| 9,023,150 | B2 * | 5/2015 | Brenneis ............ C04B 40/0092 106/685 |
| 9,376,607 | B2 | 6/2016 | James |
| 9,505,659 | B2 | 11/2016 | Bickbau |
| 9,567,841 | B2 | 2/2017 | Rothrock et al. |
| 9,670,762 | B2 | 6/2017 | Nguyen et al. |
| 9,776,919 | B2 | 10/2017 | Sabio et al. |
| 9,796,903 | B2 | 10/2017 | Agapiou et al. |
| 9,896,903 | B2 | 2/2018 | Fonseca Ocampos et al. |
| 10,246,626 | B2 | 4/2019 | Reddy |
| 10,301,529 | B2 | 5/2019 | Reddy |
| 10,323,171 | B2 | 6/2019 | Reddy |
| 10,323,172 | B2 | 6/2019 | Reddy |
| 10,329,473 | B2 | 6/2019 | Reddy |
| 2004/0014608 | A1 | 1/2004 | Nguyen et al. |
| 2006/0081369 | A1 | 4/2006 | Kriegal |
| 2007/0034118 | A1 | 2/2007 | Jardine et al. |
| 2007/0056730 | A1 | 3/2007 | Keese et al. |
| 2007/0204992 | A1 | 9/2007 | Davis et al. |
| 2009/0205824 | A1 | 8/2009 | Sullivan et al. |
| 2009/0305038 | A1 | 12/2009 | Duran et al. |
| 2011/0067867 | A1 | 3/2011 | Reddy et al. |
| 2012/0145387 | A1 | 6/2012 | Pyatina et al. |
| 2013/0161003 | A1 | 6/2013 | Makarychev-Mikhailov et al. |
| 2013/0319672 | A1 | 12/2013 | Reddy et al. |
| 2014/0251614 | A1 | 9/2014 | Muthusamy et al. |
| 2014/0374097 | A1 | 12/2014 | Morgan et al. |
| 2015/0021098 | A1 | 1/2015 | Kippie |
| 2015/0218905 | A1 | 8/2015 | Chatterji et al. |
| 2015/0299042 | A1 | 10/2015 | Hesse et al. |
| 2015/0337620 | A1 * | 11/2015 | Fonseca Ocampos .. C09K 8/46 166/280.2 |
| 2016/0096988 | A1 | 4/2016 | Lin et al. |
| 2016/0237341 | A1 | 8/2016 | Bhamidipati et al. |
| 2016/0264839 | A1 | 9/2016 | Mata et al. |
| 2017/0174571 | A1 | 6/2017 | Dubey |
| 2017/0210669 | A1 | 7/2017 | Gu et al. |

FOREIGN PATENT DOCUMENTS

| | | |
|---|---|---|
| CN | 103332919 B | 7/2015 |
| CN | 105541159 A | 5/2016 |
| CN | 106317321 A | 1/2017 |
| EP | 0375081 A1 | 6/1990 |
| EP | 1004557 A1 | 5/2000 |
| EP | 3087843 A1 | 11/2016 |
| GB | 1353134 A | 5/1974 |
| WO | 2010019535 A2 | 2/2010 |
| WO | 2011012921 A1 | 2/2011 |
| WO | 2015138453 A1 | 9/2015 |
| WO | 2017039652 A1 | 3/2017 |
| WO | 2017048222 A1 | 3/2017 |
| WO | 2017048230 A1 | 3/2017 |
| WO | 2017052515 A1 | 3/2017 |

OTHER PUBLICATIONS

ChemSpider; "Divinyl sulfone" accessible as of Jul. 11, 2018 at the website: http://www.chemspider.com/Chemical-Structure.6251.html.

DifferenceBetween.com; "Difference Between Clinker and Cement" Oct. 23, 2011, available as of Jun. 4, 2018 at https://www.differencebetween.com/difference-between-clinker-and-vs-cement/; pp. 1-5.

International Search Report and Written Opinion for International Application No. PCT/US2018/041917 (SA5701); International Filing Date Jul. 13, 2018; dated Oct. 1, 2018 (pp. 1-14).

International Search Report and Written Opinion for International Application No. PCT/US2018/041919 (SA5703); International Filing Date Jul. 13, 2018; dated Oct. 1, 2018 (pp. 1-14).

International Search Report and Written Opinion for related PCT application PCT/US2018/041918 (SA5702) International Filing Date Jul. 13, 2018; dated Oct. 23, 2018 (pp. 1-18).

Understanding Cement; "Portland cement clinker—overview" available as of Oct. 18, 2018 at the website: https://www.understanding-cement.com/clinker.html; pp. 1-6.

Wastes—Non-Hazardous Waste—Industrial Waste; "Cement Kiln Dust Waste" Special Wastes, Wastes, US EPA, accessible as of Apr. 19, 2016 at the website: https://archive.epa.gov/epawaste/nonhaz/industrial/special/web/html/index-2.html; pp. 1-3.

Wikipedia; "Clinker (cement)" accessible as of Jul. 11, 2018 at the website: https://en.wikipedia.org/wiki/Clinker_(cement); pp. 1-3.

* cited by examiner

US 10,619,090 B1

FRACTURING FLUID COMPOSITIONS HAVING PORTLAND CEMENT CLINKER AND METHODS OF USE

BACKGROUND

Field of the Disclosure

The present disclosure generally relates to a hydraulic fracturing fluids for oil and gas wells. More specifically, embodiments of the disclosure relate to a proppant for use in hydraulic fracturing.

Description of the Related Art

Hydraulic fracturing (also referred to as "fracking") is used to stimulate production in hydrocarbon-containing formations by using materials to break ("fracture") a formation and release hydrocarbons such as oil and gas. After drilling a well, fracturing fluids, such as water or chemicals, may be injected into the well to reach a sufficient pressure to fracture the formation. A fracturing fluid may contain proppants to hold open fractures created in the formation. Some proppants, such as fracturing grade sand (referred to as "frac sand"), have been used in hydraulic fracturing for several decades. The performance of the proppants is defined by many parameters, including strengths, percentage of fines generated under pressure, shape of the grains, size distribution, and mono- or multi-layer distribution.

SUMMARY

Existing proppants may lack an optimal combination of performance and cost. For example, synthetic ceramic beads and bauxite may be relatively greater strength proppants but suffer from greater cost. Fracturing grade sand (referred to as "frac sand") may be considered a lesser cost proppant with medium performance, but may suffer from availability problems to meet demand.

Hydraulic fracturing techniques have been developed to improve fracture conductivity and increase production rates. Such techniques include injection of alternate sequences of proppant-laden fluids with proppant-free fluids, or using thermally or hydrolytically degradable particles in combination with traditional proppants. The problem with the latter approach is that the degradable particles do not generally have sufficient strength for functioning as a proppant. In addition, the degradation rates are not easily controllable.

Additional techniques include multi-stage fracturing using diverting agents such as polylactic acid (PLA). Diverting agents allow for temporary sealing off a fractured zone, so that the fracturing fluid can be diverted to a different zone to continue fracturing without interruption. However, when the well is put back on production, the initiation of fluid production is often delayed due to the time it takes for the diverting agent to degrade.

In view of these problems, there is a need for a proppant that is of relatively greater strength as compared to existing proppants and that is readily available and amenable to resin coating. There is also a need a relatively great strength and degradable proppant that can withstand overburden pressures like existing proppants but also be degraded when desired. There is also a need for diverting agents that degrade relatively quickly, including "on-demand," compared to existing diverting agents.

Cement clinker is produced during the production of cement in a cement kiln, typically operating at temperatures around 1450° C. to 1600° C. from raw materials such as lime, sand, alumina, and iron oxide. After cooling, the cement clinker may contain a mixture a powder, irregularly shaped chunks, and spherical balls. The spherical particles of the cement clinker may be at or less than a No. 4 mesh size (about 4.76 millimeters). To produce usable cement, the cement clinker is mixed with grinding aids (such as gypsum) and anti-flash setting agents and ground to a desired particle size.

When exposed to water, Portland cement clinker does not behave like Portland cement and does not set into a cohesive mass similar to ground Portland cement. The granules of the cement clinker retain their shape even after hydration without forming a cohesive mass. The cement clinker may be soluble in acids to form water-soluble calcium salts after reaction.

In one embodiment, a method of hydraulic fracturing a subterranean formation is provided. The method includes injecting a hydraulic fluid into a subterranean formation, the hydraulic fluid including a proppant composition. The proppant composition includes a first proppant including Portland cement clinker and a second proppant selected from the group consisting of frac sand, bauxite proppant, ceramic proppant, and polymer proppant.

In some embodiments, the method includes injecting an acid into the subterranean formation and contacting the acid with the Portland cement clinker such that the acid dissolves the Portland cement clinker to create conductivity pathways in a plurality of fractures in the subterranean formation. In some embodiments, the Portland cement clinker is coated with a resin. In some embodiments, the resin includes a phenol-formaldehyde resin. In some embodiments, the Portland cement clinker includes ASTM Type I Portland cement clinker. In some embodiments, the Portland cement clinker has a sieve cut of 20/40, 16/20, or 40/70. In some embodiments, the Portland cement clinker includes API Class G Portland Cement clinker. In some embodiments, the frac sand includes resin-coated frac sand, the bauxite proppant includes resin-coated bauxite proppant, the ceramic proppant includes resin-coated ceramic proppant, and the polymer proppant includes resin-coated polymer proppant.

In another embodiment, a proppant composition for use in hydraulic fracturing is provided. The proppant composition includes a first proppant including Portland cement clinker and a second proppant selected from the group consisting of frac sand, bauxite proppant, ceramic proppant, and polymer proppant.

In some embodiments, the Portland cement clinker is coated with a resin. In some embodiments, the resin includes a phenol-formaldehyde resin. In some embodiments, the Portland cement clinker includes ASTM Type I Portland cement clinker. In some embodiments, the Portland cement clinker has a sieve cut of 20/40, 16/20, or 40/70. In some embodiments, the Portland cement clinker includes API Class G Portland Cement clinker.

In another embodiment, a method of manufacturing a proppant composition for use in hydraulic fracturing is provided. The method includes heating Portland cement clinker in a mixer to a temperature of at least 370° F., and adding a resin to the Portland cement clinker to form a clinker-resin mixture. The method further includes mixing the clinker-resin mixture for a mixing time period, adding a curing agent to the clinker-resin mixture, and curing the resin for a curing time period to produce resin-coated Portland cement clinker.

In some embodiments, the method includes mixing the resin-coated Portland cement clinker with a proppant selected from the group consisting of a frac sand, a bauxite proppant, a ceramic proppant, and a polymer proppant. In some embodiments, the resin includes a phenol-formaldehyde resin. In some embodiments, the curing agent includes hexamethylenetetramine. In some embodiments, the Portland cement clinker includes ASTM Type I Portland cement clinker. In some embodiments, the Portland cement clinker has a sieve cut of 20/40. In some embodiments, the mixing time period includes at least 3 minutes. In some embodiments, the curing time period includes at least 3 minutes.

DETAILED DESCRIPTION

Figure 1:
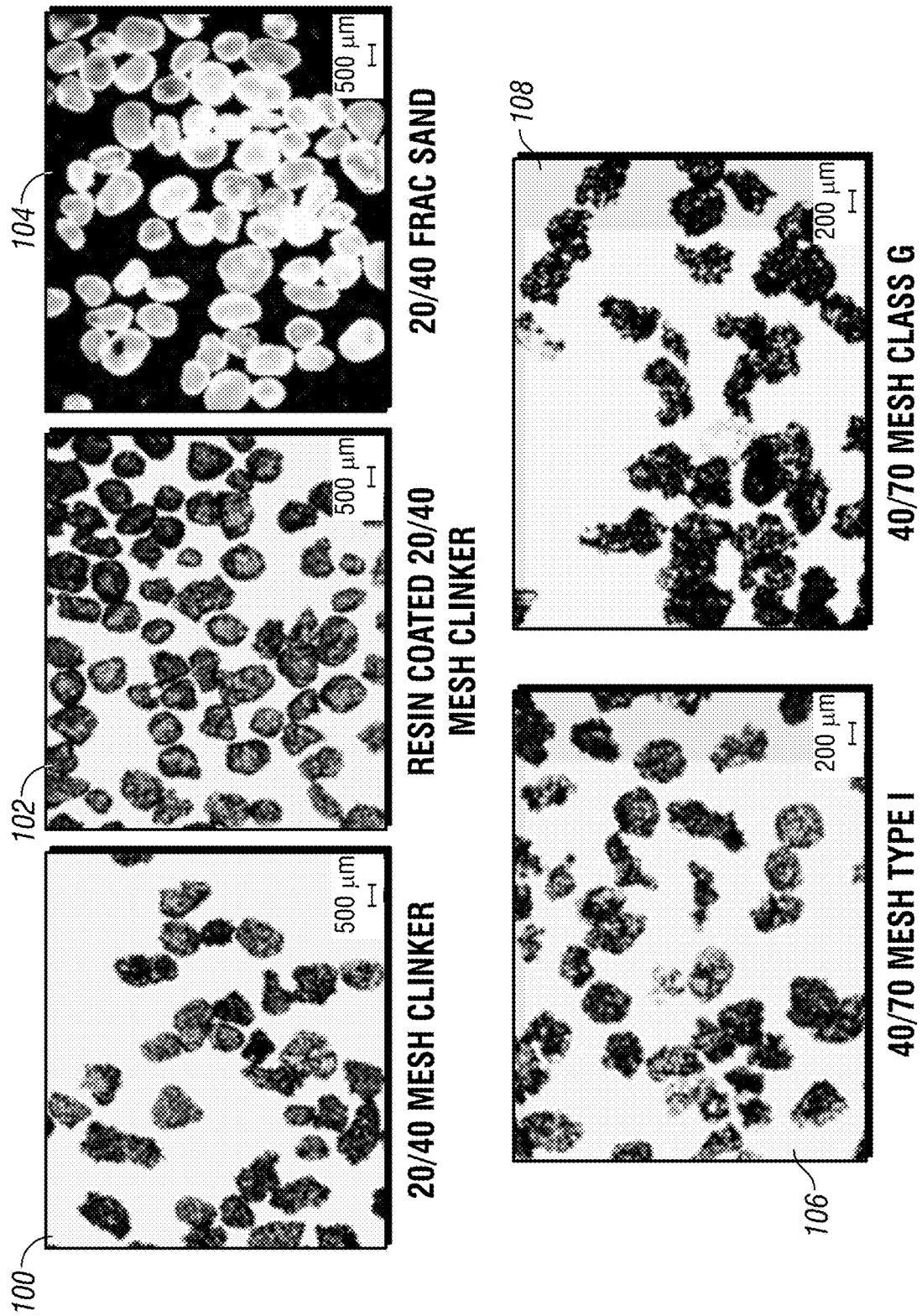
FIG. 1 depicts various microscopic images of Portland cement clinker particles at different sieve sizes, a conventional frac sand, and resin-coated Portland cement clinker in accordance with an embodiment of the disclosure.

The present disclosure will be described more fully with reference to the accompanying drawings, which illustrate embodiments of the disclosure. This disclosure may, however, be embodied in many different forms and should not be construed as limited to the illustrated embodiments. Rather, these embodiments are provided so that this disclosure will be thorough and complete, and will fully convey the scope of the disclosure to those skilled in the art.

As used in the disclosure, the term "cement clinker" or "Portland cement clinker" refers to a substance distinct from cement and formed during the manufacture of Portland cement during the cement kiln stage. As used in the disclosure, "cement clinker" or "Portland cement clinker" refers to non-hydraulic, non-cementiceous unground Portland cement clinker particles. As used in the disclosure, "cement clinker" or "Portland cement clinker" does not include conventional cement that is ground up to promote its reactivity with water and other components (for example, gypsum) to form set cement. As used in the disclosure, the "size" of a cement clinker refers to the size (for example, diameter for generally spherical particles) of the non-hydraulic, non-cementiceous unground particles of the cement clinker.

Embodiments of the disclosure include proppant compositions that include Portland cement clinker. In some embodiments, a cement clinker proppant composition for hydraulic fracturing includes Portland cement clinker and another proppant. In some embodiments, a cement clinker proppant composition for hydraulic fracturing includes resin-coated Portland cement clinker and another proppant. In some embodiments, a proppant for hydraulic fracturing consists of Portland cement clinker. In some embodiments, a proppant for hydraulic fracturing consists of resin-coated Portland cement clinker.

EXAMPLES

The following examples are included to demonstrate embodiments of the disclosure. It should be appreciated by those of skill in the art that the techniques and compositions disclosed in the example which follows represents techniques and compositions discovered to function well in the practice of the disclosure, and thus can be considered to constitute modes for its practice. However, those of skill in the art should in light of the present disclosure appreciate that many changes can be made in the specific embodiments which are disclosed and still obtain a like or a similar result without departing from the spirit and scope of the disclosure.

Example Portland cement clinker proppant compositions were prepared and tested according to the techniques described in the disclosure. American Society for Testing and Materials (ASTM) Type I Portland cement clinker and American Petroleum Institute (API) Class G raw cement clinker were obtained from a cement company. The raw Portland cement clinker was sieved to obtain 16/20 ASTM Type I cement clinker particles (that is, cement clinker particles having a sieve cut of 16/20 such that the particles have a size range of about 1.19 millimeters (mm) to about 0.841 mm), 20/40 ASTM Type I cement clinker particles (that is, cement clinker particles having a sieve cut of 20/40 such that the particles have a size range of about 0.841 mm to about 0.420 mm), and 40/70 ASTM Type I cement clinker particles (that is, cement clinker particles having a sieve cut of 40/70 such that the particles have a size range of about 0.420 mm to about 0.210 mm), and 40/70 API Class G cement clinker particles. Example cement clinker proppant compositions having uncoated Portland cement clinker and resin-coated Portland cement clinker particles were prepared according to the techniques described infra.

Treatment with Hydration Accelerator

20/40 ASTM Type I cement clinker particles were hot rolled in a calcium chloride ($CaCl_2$)) solution at about 150° F. for 24 hours by using a suspension of 200 grams of 20/40 ASTM Type I cement clinker particles in 0.3% calcium chloride ($CaCl_2$)) solution. The cement clinker-calcium chloride suspension was cooled, decanted, and rinsed several times with fresh water until the supernatant showed a diminishment in perceived turbidity. The resulting solid was dried in an oven at a temperature of about 150° F. for 24 hours.

Resin Coating Procedure

An example resin-coated cement clinker composition was prepared by coating 150 grams of 20/40 ASTM Type I cement clinker particles with 6.3 grams (g) of Plenco Novolac Resin #14542 manufactured by Plenco Plastics Engineering Company of Sheboygan, Wis., USA. 150 grams of the cement clinker particles were mixed using an overhead mixer at about 600 revolutions-per-minute (rpms) and heated to about 370° F. in a 250 milliliters (ml) beaker wrapped in heating tape. Once the uncoated cement clinker particles reached the target temperature of about 370° F., 6.3 grams (g) of the Novolac resin was added to the uncoated cement clinker particles and the mixing rate was increased to about 2,200 rpms. The example proppant composition was mixed for an additional three minutes (min) or until all of the Novolac resin melted onto the clinker such that the resin was perceived to be a uniform and complete coating of the clinker. Next, 0.92 grams of hexamethylenetetramine curing agent was added to the resin-coated cement clinker particles. The resin was allowed to cure for 3 minutes before removing from the heat source.

The crush strength of each example cement clinker proppant composition was tested using a Forney Strength tester equipped with a 250,000 pound force (lbf) load cell. Table 1 depicts the results of the crush strength testing at various pressures (in pounds per square inch (psi)), with the Final Weight (Wt) referring to the amount of crushed fines that went through a No. 40 mesh size (0.420 millimeters) sieve:

| Cement Clinker Proppant Mesh Size/Label | Stress (psi) | Initial Wt (g) | Final Wt (g) | Percent Crushed (%) |
| --- | --- | --- | --- | --- |
| 16/20 ASTM Type I | 1000 | 36 | 17.2797 | 48.0 |
|  | 2000 | 34.1757 | 19.8308 | 58.0 |
|  | 4000 | 34.1065 | 23.2238 | 68.1 |
| 20/40 ASTM Type I | 1000 | 33.2993 | 3.1103 | 9.3 |
|  | 2000 | 33.2397 | 4.4869 | 13.5 |
|  | 4000 | 34.6332 | 6.9045 | 20.0 |
| CaCl$_2$ Treated 20/40 ASTM Type I | 1000 | 34.7243 | 7.4804 | 21.5 |
|  | 2000 | 34.6094 | 10.6508 | 30.8 |
|  | 4000 | 34.2995 | 14.5207 | 42.3 |
| Resin-coated 20/40 ASTM Type I | 1000 | 33.4863 | 0.6817 | 2.0 |
|  | 2000 | 35.0609 | 1.201 | 3.4 |
|  | 4000 | 33.5294 | 2.9618 | 8.8 |
| 40/70 ASTM Type I | 1000 | 33.8216 | 5.3878 | 16.0 |
|  | 2000 | 32.1359 | 8.4126 | 26.2 |
|  | 4000 | 35.3271 | 12.6276 | 35.7 |
| 40/70 API Class G | 1000 | 33.8149 | 7.9651 | 23.6 |
|  | 2000 | 31.8024 | 12.2713 | 38.6 |
|  | 4000 | 32.7788 | 15.1503 | 46.2 |

Table 1: Crush Strength Testing Results for Cement Clinker Proppant Compositions The results in Table 1 show that the cement clinker proppant compositions exhibited compressive strengths and fine particle amounts in the ranges useful for fracturing operations. The cement clinker proppant compositions having Portland cement clinker treated with calcium chloride exhibited greater brittleness than then untreated Portland cement clinker. The as-produced Portland cement clinker may thus be more load bearing than the Portland cement clinker hydrated with calcium chloride. The cement clinker proppant compositions having resin-coated cement clinker exhibited increased crush strength and also showed a significant reduction in the percentage of fines generated (that is, the percentage of clinker particles that were crushed to generate smaller particles. The results in Table 1 show that resin-coated or uncoated Portland cement clinker may be suitable in as proppants in zones where the overburden pressures are relatively small, such as at shallower well depths.

FIG. 1 depicts various microscopic images of cement clinker particles at different mesh sizes, a conventional frac sand, and resin-coated clinker. FIG. 1 depicts the following microscopic images: a picture 100 of 20/40 ASTM Type I cement clinker particles; a picture 102 of resin-coated 20/40 ASTM Type I cement clinker particles; a picture 104 of 20/40 frac sand; a picture 106 of 40/70 ASTM Type I cement clinker particles; and a picture 108 of 40/70 API Class G cement clinker particles. As shown in the images in FIG. 1, the 20/40 frac sand is relatively more spherical than the 40/70 ASTM Type I cement clinker particles which may affect the crush strength results shown in Table 1. As also shown by images 100 and 102 in FIG. 1, coating the 20/40 ASTM Type I cement clinker particles with resin results in cement clinker particles having smoother surfaces and rounder edges.

Portland Cement Clinker and Second Proppant Compositions

Figure 2A:
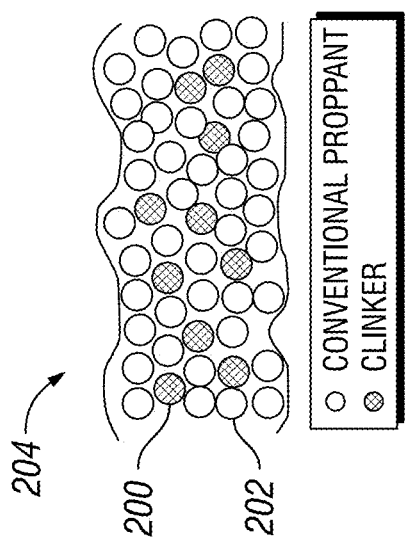
FIGS. 2A, 2B, and 2C are schematic diagrams of the use of Portland cement clinker with another proppant to form increased conductivity pathways in accordance with an embodiment of the disclosure.
Figure 2B:
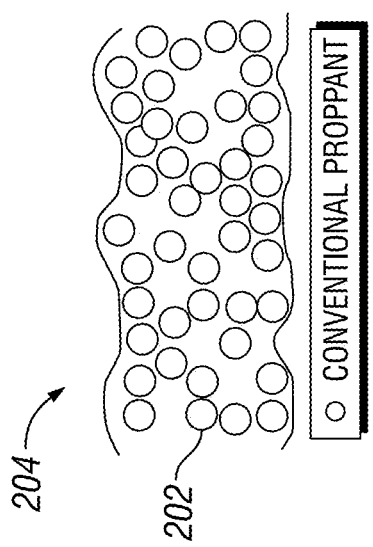
Figure 2C:
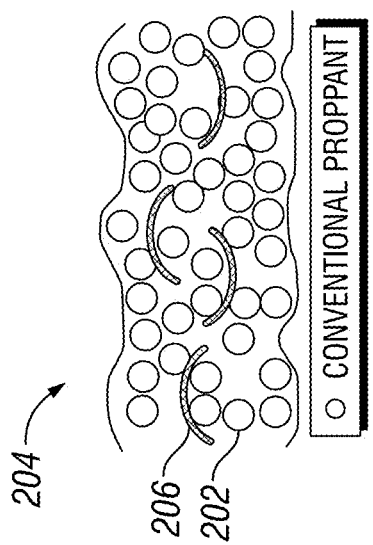

In some embodiments, Portland cement clinker may be combined with another (that is, second) proppant to enable the formation of increased conductivity pathways for fluid flow (that is, pathways having increased conductivity as compared to induced fractures using conventional proppants). FIGS. 2A-2C depict the use of Portland cement clinker with a second proppant to form increased conductivity pathways in accordance with an embodiment of the disclosure. FIG. 2A depicts a proppant composition having cement clinker 200 and another proppant 202 placed into a fracture 204. The proppant 202 may include sand (for example, "frac sand"), bauxite proppants, ceramic proppants, or polymer proppants.

After placement of the proppant composition in the fracture 204, the cement clinker 200 may be removed via an acid treatment in the well. In some embodiments, the acid treatment may use mineral acids, such as hydrochloric acid or sulfuric acid. In other embodiments, the acid treatment may use organic acids, such as acetic acid, methanesulfonic acid (MSA), N,N-bis(carboxymethyl) glutamic acid (GLDA), iminodisuccinic acid, aspartic acid, fumaric acid, or malic acid. FIG. 2B depicts the fracture 204 after removal of the cement clinker 200 with the conventional proppant 202 remaining in the fracture 204.

After removal of the cement clinker, the spaces created after removal of the cement clinker may form increased conductivity pathways between the conventional proppant 202 in the fracture 204. FIG. 2C depicts increased conductivity pathways 206 formed in the fracture 204 by the removal of the cement clinker 200. The increased conductivity pathways 206 may enable fluid flow through the fracture and increase recovery of fluid from the well after fracturing.

In some embodiments, a proppant composition includes untreated Portland cement clinker and a proppant. As used in the disclosure, the term "untreated" cement clinker refers to cement clinker as obtained from a cement kiln and that is not introduced to or treated with a chemical (for example, an alkali, acid, or salt) after removal from the kiln. The Portland cement clinker may be ASTM Type I cement clinker or API Class G raw cement clinker.

In some embodiments, the Portland cement clinker may be sieved to obtain a size range of cement clinker particles defined by a specific sieve cut. For example, in some embodiments, the cement clinker may be the following sizes: 16/20 Portland cement clinker, 20/40 Portland cement clinker, or 40/70 Portland cement clinker. In some embodiments, the cement clinker may be 16/20 ASTM Type I cement clinker, 20/40 ASTM Type I cement clinker, 40/70 ASTM Type I cement clinker, or 40/70 API Class G cement clinker particles.

In some embodiments, a proppant composition includes resin-coated Portland cement clinker and a proppant. The Portland cement clinker may be ASTM Type I cement clinker or API Class G cement clinker. In some embodiments, the resin-coated Portland cement clinker may 20/40 Portland cement clinker. In some embodiments, the cement clinker may be 20/40 ASTM Type I cement clinker.

In some embodiments, the Portland cement clinker may be coated with a phenol-formaldehyde resin (that is, Novolac) resin. The resin coating the Portland cement clinker may be fully cured or partially cured (that is, a curing degree less than 100% but greater than 20%). In some embodiments, the Portland cement clinker may be mixed in a mixer at a speed of at least 600 rpms and heated to a temperature of at least 370° F. The resin may be added to the mixer during mixing to form a cement clinker-resin mixture, and the mixing rate may be increased to at least 2,200 rpms. The cement clinker-resin mixture may be mixed until all of the resin has melted onto the cement clinker particles such that the resin is perceived to be a uniform and complete coating of the clinker. In some embodiments, the cement clinker-resin mixture may be mixed for at least 3 minutes. After the all of the resin has melted onto the cement clinker particles, a curing agent may be added to the cement clinker-resin mixture. In some embodiments, the curing agent is hexamethylenetetramine. In some embodiments, the curing agent may be allowed to cure for at least 3 minutes to produce the resin-coated Portland cement clinker for use in the proppant composition described in the disclosure.

The cement clinker proppant composition may include various types of second proppants. In some embodiments, the second proppant may be sand (for example, "frac sand," including white sand and brown sand), bauxite proppants, ceramic proppants, or polymer proppants. The second proppant may include resin-coated version of these proppants (for example, resin-coated sand, resin-coated bauxite proppants, resin-coated ceramic proppants, or resin-coated polymer proppants). Such polymer proppants may include nylon. In some embodiments, the cement clinker proppant composition consists of Portland cement clinker and a second proppant. In some embodiments, the cement clinker proppant composition consists of resin-coated Portland cement clinker and a second proppant.

Figure 3:
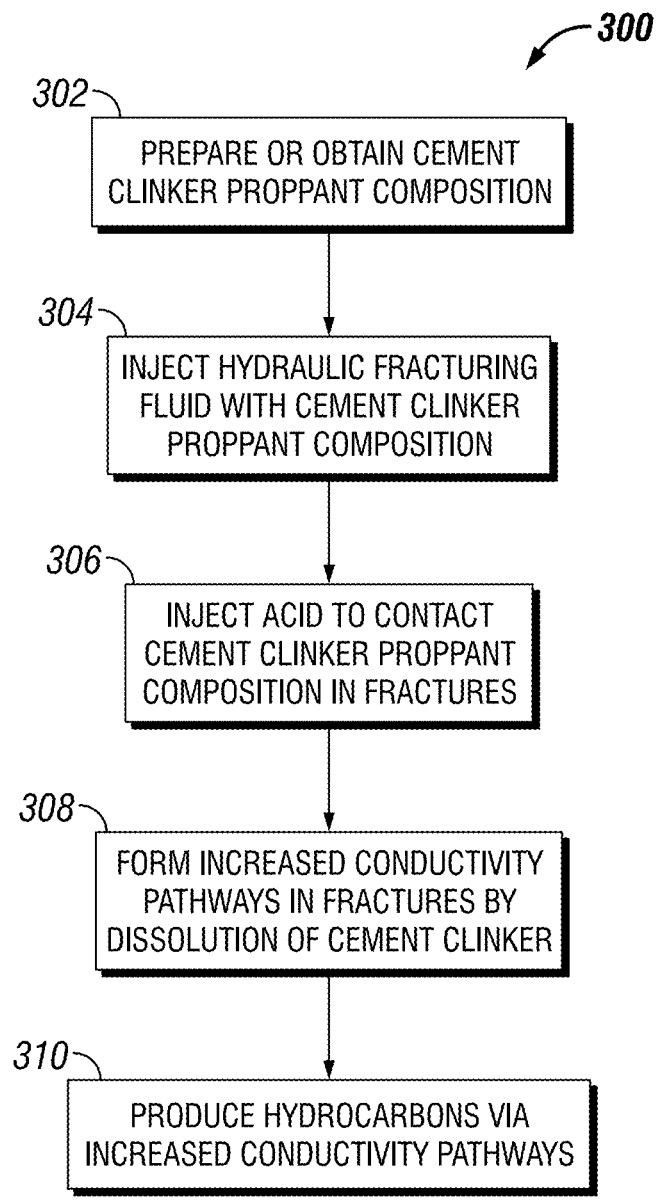
FIG. 3 is a flowchart of a process for hydraulic fracturing using a Portland cement clinker proppant composition to form increased conductivity pathways in accordance with an embodiment of the disclosure.

The cement clinker proppant compositions may be used in a hydraulic fracturing operation to hold open fractures created in the formation after inducement of the fractures and create increased conductivity pathways in the fractures. FIG. 3 depicts a process 300 for hydraulic fracturing by using a cement clinker proppant composition to form increased conductivity pathways in accordance with an embodiment of the disclosure. Initially, a cement clinker proppant composition may be prepared or obtained (block 302). The cement clinker proppant composition may include untreated Portland cement clinker and another proppant, or resin-coated Portland cement clinker and another proppant. Next, a hydraulic fracturing fluid having the cement clinker proppant composition may be injected into a subterranean formation via one or more wells using known fracturing techniques (block 304). For example, the hydraulic fracturing fluid may include water and other components, such as polymers, crosslinkers, fluid loss additives, flow back additives, surfactants, clay stabilizers, and gel breakers. In other embodiments, a treatment fluid containing the cement clinker proppant composition may be injected into the subterranean formation after injection of a hydraulic fracturing fluid that does not include the cement clinker proppant composition.

After injection, the cement clinker proppant composition may penetrate fractures in the subterranean formation. Next, an acid may be injected into one or more wells to contact with the cement clinker proppant composition in the fractures (block 306). In some embodiments, the acid may be allowed to contact the cement clinker proppant composition for a time period sufficient to enable the cement clinker to dissolve after contact with the acid. As discussed in the disclosure, increased conductivity pathways may be formed in the fractures by the dissolution of the cement clinker by the acid (block 308). Hydrocarbons may be produced via the increased conductivity pathways formed in the fracture (block 310).

Portland Cement Clinker Proppant

In some embodiments, a proppant consists of Portland cement clinker and does not include any other proppant components. In some embodiments, the Portland cement clinker consists of ASTM Type I cement clinker or API Class G cement clinker. In some embodiments, the proppant consists of 20/40 ASTM Type I cement clinker. In some embodiments, the proppant consists of 16/20 ASTM Type I cement clinker. In some embodiments, the proppant consists of 40/70 ASTM Type I cement clinker. In some embodiments, the proppant consists of 40/70 API Class G cement clinker.

In some embodiments, the proppant consists of untreated Portland cement clinker. As used in the disclosure, the term "untreated" cement clinker refers to cement clinker as obtained from a cement kiln (that is, "raw" cement clinker) and that is not introduced to or treated with a chemical (for example, an alkali, acid, or salt) after removal from the kiln.

In some embodiments, the proppant consists of resin-coated Portland cement clinker. The cement clinker particles may be coated with a phenol-formaldehyde resin (that is, Novolac) resin according to the techniques described in the disclosure. The resin-coated Portland cement clinker may be ASTM Type I cement clinker or API Class G cement clinker. In some embodiments, the resin-coated cement clinker may 20/40 cement clinker particles. In some embodiments, the cement clinker may be 20/40 ASTM Type I cement clinker particles.

A Portland cement clinker may be used in a hydraulic fracturing operation to hold open fractures created in the formation after inducement of the fractures and create increased conductivity pathways in the fractures. A hydraulic fracturing fluid that includes the Portland cement clinker may be injected into a subterranean formation via one or more wells using known fracturing techniques. For example, the hydraulic fracturing fluid may include water and other components, such as polymers, crosslinkers, fluid loss additives, flow back additives, surfactants, clay stabilizers, and gel breakers. In other embodiments, a treatment fluid containing the Portland cement clinker may be injected into the subterranean formation after injection of a hydraulic fracturing fluid that does not include the Portland cement clinker. Hydrocarbons may be produced through fractures induced in the subterranean formation via the fracturing operation and held open by the Portland cement clinker proppant.

In other embodiments, the Portland cement clinker may be used as a diverting agent in hydraulic fracturing operations. In such embodiments, a diverting agent for use in hydraulic fracturing may include Portland cement clinker or resin-coated Portland cement clinker. For example, a diverting agent may consist of Portland cement clinker or resin-coated Portland cement clinker. In such embodiments, the diverting agent may be introduced into a well to plug or seal portions of the well and enable fluid to flow past or be diverted to other sections of the well. After introduction of the cement clinker, the cement clinker diverting agent may be degraded by introducing an acid to contact the Portland cement clinker. After contact with the acid, the Portland cement clinker diverting agent may dissolve and reopen the portions of the well. In some embodiments, the diverting agent consists of ASTM Type I cement clinker or API Class G cement clinker. In some embodiments, the diverting agent consists of 20/40 ASTM Type I cement clinker. In some embodiments, the diverting agent of 16/20 ASTM Type I cement clinker. In some embodiments, the diverting agent consists of 40/70 ASTM Type I cement clinker. In some embodiments, the diverting agent consists of 40/70 API Class G cement clinker.

Ranges may be expressed in the disclosure as from about one particular value to about another particular value or both. When such a range is expressed, it is to be understood that another embodiment is from the one particular value to the other particular value or both, along with all combinations within said range.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described in the disclosure. It is to be understood that the forms shown and described in the disclosure are to be taken as examples of embodiments. Elements and materials may be substituted for those illustrated and described in the disclosure, parts and processes may be reversed or omitted, and certain features may be utilized independently, all as would be apparent to one skilled in the art after having the benefit of this description. Changes may be made in the elements described in the disclosure without departing from the spirit and scope of the disclosure as described in the following claims. Headings used in the disclosure are for organizational purposes only and are not meant to be used to limit the scope of the description.

What is claimed is:

1. A method of hydraulic fracturing a subterranean formation, the method comprising:
   injecting a hydraulic fluid into a subterranean formation, the hydraulic fluid comprising a proppant composition, wherein the proppant composition comprises:
   a first proppant comprising Portland cement clinker; and
   a second proppant selected from the group consisting of frac sand, bauxite proppant, ceramic proppant, and polymer proppant;
   injecting an acid into the subterranean formation and contacting the acid with the Portland cement clinker such that the acid dissolves the Portland cement clinker to create conductivity pathways in a plurality of fractures in the subterranean formation.

2. The method of claim 1, wherein the Portland cement clinker is coated with a resin.

3. The method of claim 2, wherein the resin comprises a phenol-formaldehyde resin.

4. The method of claim 1, wherein the Portland cement clinker comprises ASTM Type I Portland cement clinker.

5. The method of claim 1, wherein the Portland cement clinker has a sieve cut of 20/40, 16/20, or 40/70.

6. The method of claim 1, wherein the Portland cement clinker comprises API Class G Portland Cement clinker.

7. The method of claim 1, wherein the frac sand comprises resin-coated frac sand, the bauxite proppant comprises resin-coated bauxite proppant, the ceramic proppant comprises resin-coated ceramic proppant, and the polymer proppant comprises resin-coated polymer proppant.

* * * * *